(12) United States Patent
Harris

(10) Patent No.: US 9,275,197 B2
(45) Date of Patent: Mar. 1, 2016

(54) SHARING AND LENDING OF DIGITAL CONTENT

(75) Inventor: Adam Harris, San Diego, CA (US)

(73) Assignee: SONY COMPUTER ENTERTAINMENT AMERICA LLC, San Mateo, CA (US)

( * ) Notice: Subject to any disclaimer, the term of this patent is extended or adjusted under 35 U.S.C. 154(b) by 86 days.

(21) Appl. No.: 13/220,157

(22) Filed: Aug. 29, 2011

(65) Prior Publication Data

US 2011/0314560 A1   Dec. 22, 2011

Related U.S. Application Data

(63) Continuation of application No. 12/506,076, filed on Jul. 20, 2009.

(51) Int. Cl.
*G06F 15/16* (2006.01)
*G06F 21/10* (2013.01)
*G06Q 30/02* (2012.01)

(52) U.S. Cl.
CPC ............... *G06F 21/10* (2013.01); *G06Q 30/02* (2013.01)

(58) Field of Classification Search
CPC ....... H04L 51/32; H04L 51/046; H04L 51/08; H04L 51/24; H04L 12/588; H04L 67/22; H04L 2209/60; H04L 2209/603; G06F 21/10; G11B 20/00753; H04N 7/1675; G06Q 30/06; G06Q 30/0601; G06Q 20/123
USPC .............. 709/206, 205, 207; 705/58–59, 26.8
See application file for complete search history.

(56) References Cited

U.S. PATENT DOCUMENTS

| 5,222,134 A | 6/1993 | Waite et al. |
| 5,233,423 A | 8/1993 | Jernigan et al. |
| 5,490,216 A | 2/1996 | Richardson, III |
| 5,523,551 A | 6/1996 | Scott |
| 5,532,735 A | 7/1996 | Blahut et al. |
| 5,636,277 A | 6/1997 | Nagahama |
| 5,794,217 A | 8/1998 | Allen |
| 5,809,145 A | 9/1998 | Slik et al. |

(Continued)

FOREIGN PATENT DOCUMENTS

| EP | 0 773 490 A1 | 5/1997 |
| EP | 0 795 809 | 9/1997 |

(Continued)

OTHER PUBLICATIONS

Merriam-Webster Online, Definition of "privilege", Apr. 25, 2009.*

(Continued)

*Primary Examiner* — Joshua Joo
(74) *Attorney, Agent, or Firm* — Lewis Roca Rothgerber Christie LLP

(57) ABSTRACT

An individual may wish to make a gift of digital media to a designated recipient. The digital media may be previously purchased by the individual or may be new, unused digital media purchased specifically as a gift for the recipient. The sender of the gift sends a gift notification. The sender is then verified to ensure that the sender is authorized to make the gift by matching an identifier of the digital media with an identifier associated with the sender. The digital media may be associated with a set of rights and privileges. Further rights and privileges associated with the digital media may be offered to the recipient.

13 Claims, 3 Drawing Sheets

(56) References Cited

U.S. PATENT DOCUMENTS

| | | | |
|---|---|---|---|
| 5,838,314 A | 11/1998 | Neel et al. | |
| 5,845,265 A | 12/1998 | Woolston | |
| 5,892,900 A | 4/1999 | Ginter et al. | |
| 5,913,040 A | 6/1999 | Rakavy et al. | |
| 6,066,182 A | 5/2000 | Wilde et al. | |
| 6,070,141 A | 5/2000 | Houvener et al. | |
| 6,073,123 A | 6/2000 | Staley | |
| 6,081,785 A | 6/2000 | Oshima et al. | |
| 6,085,176 A | 7/2000 | Woolston | |
| 6,085,262 A | 7/2000 | Sawada | |
| 6,117,011 A | 9/2000 | Lvov | |
| 6,119,108 A | 9/2000 | Holmes et al. | |
| 6,135,646 A | 10/2000 | Kahn et al. | |
| 6,137,480 A | 10/2000 | Shintani | |
| 6,148,335 A | 11/2000 | Haggard et al. | |
| 6,189,146 B1 | 2/2001 | Misra et al. | |
| 6,195,432 B1 | 2/2001 | Takahashi et al. | |
| 6,201,771 B1 | 3/2001 | Otsuka et al. | |
| 6,202,051 B1 | 3/2001 | Woolston | |
| 6,243,796 B1 | 6/2001 | Otsuka | |
| 6,247,131 B1 | 6/2001 | Kotani et al. | |
| 6,260,141 B1 | 7/2001 | Park | |
| 6,266,651 B1 | 7/2001 | Woolston | |
| 6,311,209 B1 | 10/2001 | Olson et al. | |
| 6,314,451 B1 | 11/2001 | Landsman et al. | |
| 6,405,203 B1 | 6/2002 | Collart | |
| 6,434,535 B1 | 8/2002 | Kupka et al. | |
| 6,446,260 B1 | 9/2002 | Wilde et al. | |
| 6,463,078 B1 | 10/2002 | Engstrom et al. | |
| 6,470,085 B1 | 10/2002 | Uranaka et al. | |
| 6,529,453 B1 | 3/2003 | Otsuka et al. | |
| 6,560,640 B2 | 5/2003 | Smethers | |
| 6,594,740 B1 | 7/2003 | Fukuda | |
| 6,611,607 B1 | 8/2003 | Davis et al. | |
| 6,633,849 B1 | 10/2003 | Dodd | |
| 6,640,306 B1 | 10/2003 | Tone et al. | |
| 6,655,580 B1 | 12/2003 | Ergo | |
| 6,694,025 B1 | 2/2004 | Epstein et al. | |
| 6,832,318 B1 | 12/2004 | Yaegashi et al. | |
| 6,920,565 B2 | 7/2005 | Isaacson et al. | |
| 7,313,251 B2 | 12/2007 | Rhoads | |
| 7,426,750 B2 | 9/2008 | Cooper | |
| 7,480,621 B1 | 1/2009 | Megiddo | |
| 7,515,733 B2 | 4/2009 | Rhoads | |
| 7,571,328 B2 | 8/2009 | Baumert | |
| 7,613,633 B1 | 11/2009 | Woolston | |
| 7,613,735 B2* | 11/2009 | Yao | G06Q 30/0257 |
| 7,845,002 B1* | 11/2010 | Boyer et al. | 726/6 |
| 8,073,740 B1* | 12/2011 | Siegel et al. | 705/26.1 |
| 8,190,519 B1* | 5/2012 | Angilivelil et al. | 705/39 |
| 2001/0007981 A1 | 7/2001 | Woolston | |
| 2001/0020295 A1 | 9/2001 | Satoh | |
| 2001/0025256 A1 | 9/2001 | Oliphant et al. | |
| 2001/0034721 A1 | 10/2001 | Boudreau et al. | |
| 2001/0042021 A1 | 11/2001 | Matsuo et al. | |
| 2001/0051996 A1 | 12/2001 | Cooper et al. | |
| 2002/0016922 A1 | 2/2002 | Richards et al. | |
| 2002/0029252 A1 | 3/2002 | Segan et al. | |
| 2002/0052816 A1 | 5/2002 | Clenaghan et al. | |
| 2002/0077988 A1 | 6/2002 | Sasaki et al. | |
| 2002/0082997 A1 | 6/2002 | Kobata et al. | |
| 2002/0103855 A1 | 8/2002 | Chatani | |
| 2002/0104019 A1 | 8/2002 | Chatani et al. | |
| 2002/0116206 A1 | 8/2002 | Chatani | |
| 2002/0116275 A1 | 8/2002 | Woolston | |
| 2002/0116283 A1 | 8/2002 | Chatani | |
| 2002/0129094 A1 | 9/2002 | Reisman | |
| 2002/0161709 A1 | 10/2002 | Floyd et al. | |
| 2002/0196940 A1 | 12/2002 | Isaacson et al. | |
| 2003/0032486 A1 | 2/2003 | Elliott et al. | |
| 2004/0133512 A1 | 7/2004 | Woolston | |
| 2004/0205028 A1 | 10/2004 | Verosub | |
| 2004/0220878 A1 | 11/2004 | Lao et al. | |
| 2005/0033655 A1 | 2/2005 | Woolston | |
| 2005/0049929 A1* | 3/2005 | Hsu et al. | 705/26 |
| 2005/0204405 A1 | 9/2005 | Wormington | |
| 2005/0216548 A1 | 9/2005 | Wormington et al. | |
| 2005/0261988 A1 | 11/2005 | Horel | |
| 2006/0253399 A1 | 11/2006 | Chatani | |
| 2007/0088622 A1 | 4/2007 | Floyd | |
| 2007/0174385 A1 | 7/2007 | DuFour | |
| 2007/0207780 A1 | 9/2007 | McLean | |
| 2007/0271184 A1 | 11/2007 | Niebert | |
| 2007/0271188 A1* | 11/2007 | Burkholder | 705/52 |
| 2007/0282850 A1 | 12/2007 | Sachnoff | |
| 2008/0082405 A1 | 4/2008 | Martinez | |
| 2008/0120196 A1 | 5/2008 | Reed et al. | |
| 2008/0126223 A1* | 5/2008 | Chatani | 705/26 |
| 2008/0154898 A1 | 6/2008 | Cheng | |
| 2008/0167994 A1 | 7/2008 | Li et al. | |
| 2008/0189188 A1 | 8/2008 | Morgenstern | |
| 2008/0244038 A1 | 10/2008 | Martinez | |
| 2008/0256592 A1* | 10/2008 | Schnell et al. | 726/1 |
| 2008/0313040 A1 | 12/2008 | Rose | |
| 2009/0006225 A1 | 1/2009 | Multerer | |
| 2009/0055288 A1* | 2/2009 | Nassimi | 705/26 |
| 2009/0083281 A1* | 3/2009 | Sarig et al. | 707/10 |
| 2009/0083541 A1* | 3/2009 | Levine | G06F 21/10 713/165 |
| 2009/0234755 A1* | 9/2009 | Sidoruk | 705/27 |
| 2009/0327121 A1* | 12/2009 | Carroll et al. | 705/39 |
| 2010/0082489 A1* | 4/2010 | Lin et al. | 705/59 |
| 2010/0280879 A1 | 11/2010 | O'Sullivan et al. | |
| 2010/0299151 A1* | 11/2010 | Soroka et al. | 704/500 |
| 2010/0306038 A1 | 12/2010 | Harris | |
| 2011/0016182 A1* | 1/2011 | Harris | G06Q 30/02 709/206 |
| 2012/0330790 A1 | 12/2012 | Chatani | |

FOREIGN PATENT DOCUMENTS

| | | |
|---|---|---|
| EP | 1 016 960 A1 | 7/2000 |
| JP | 9-244886 | 9/1997 |
| JP | 10-069511 | 3/1998 |
| JP | 10-133955 | 5/1998 |
| JP | 10-222428 | 8/1998 |
| JP | 11-143719 | 5/1999 |
| JP | 2000-020795 | 1/2000 |
| JP | 2000-227919 | 8/2000 |
| JP | 2000/298689 | 10/2000 |
| JP | 02001169246 | 6/2001 |
| KR | 1998-030143 | 7/1998 |
| KR | 1998-033266 | 7/1998 |
| KR | 2000/0060715 | 10/2000 |
| WO | WO 96/34356 | 10/1996 |
| WO | WO 00/63860 | 10/2000 |
| WO | WO 02/01333 | 1/2002 |
| WO | WO 02/067095 | 8/2002 |
| WO | WO 2011/011030 | 1/2011 |

OTHER PUBLICATIONS

Berinstein, Paula; "DOI: A New identifier for digital content" (Jan. 1998): 72-77.
U.S. Appl. No. 12/011,903 Office Action mailed Mar. 6, 2014.
Alice Atkinson-Bonasio, Video Game Tips: How to use save points effectively published Oct. 12, 2008, www.Helium.com http://www.helium.com/items/1205745-save-feature-and-the-gaming-community pp. 1-3 retrieved Jul. 19, 2011. document titled save points on Heliump1-3.pdf.
PCT/US02/05422 International Search Report dated Sep. 12, 2002.
PCT/US10/00205 International Search Report and Written Opinion dated Mar. 12, 2010.
U.S. Appl. No. 09/894,793 Final Office Action mailed Jan. 6, 2009.
U.S. Appl. No. 09/894,793 Final Office Action mailed Nov. 20, 2007.
U.S. Appl. No. 09/894,793 Final Office Action mailed Jan. 4, 2007.
U.S. Appl. No. 09/894,793 Office Action mailed Aug. 7, 2006.
U.S. Appl. No. 09/894,793 Final Office Action mailed Feb. 7, 2006.
U.S. Appl. No. 09/894,793 Office Action mailed Aug. 23, 2005.
U.S. Appl. No. 09/894,793 Final Office Action mailed Apr. 4, 2005.
U.S. Appl. No. 09/894,793 Office Action mailed Aug. 18, 2004.
U.S. Appl. No. 13/529,669 Final Office Action mailed Oct. 25, 2013.

(56) References Cited

OTHER PUBLICATIONS

U.S. Appl. No. 13/529,669 Office Action mailed Mar. 28, 2013.
U.S. Appl. No. 12/011,903 Final Office Action mailed Dec. 8, 2009.
U.S. Appl. No. 12/011,903 Office Action mailed Mar. 30, 2009.
U.S. Appl. No. 12/473,668 Final Office Action mailed Jan. 19, 2012.
U.S. Appl. No. 12/473,668 Office Action mailed Aug. 2, 2011.
U.S. Appl. No. 12/506,076 Final Office Action mailed Oct. 9, 2013.
U.S. Appl. No. 12/506,076 Office Action mailed Oct. 5, 2012.
U.S. Appl. No. 13/529,669 Final Office Action mailed Jun. 23, 2014.
U.S. Appl. No. 12/011,903 Final Office Action mailed Jun. 16, 2014.
U.S. Appl. No. 13/529,669 Final Office Action mailed Jan. 22, 2015.
U.S. Appl. No. 12/011,903 Office Action mailed Jan. 6, 2015.
U.S. Appl. No. 12/506,076 Final Office Action mailed Jul. 31, 2015.

* cited by examiner

SHARING AND LENDING OF DIGITAL CONTENT

CROSS-REFERENCE TO RELATED APPLICATIONS

The present patent application is a continuation and claims the priority benefit of U.S. patent application Ser. No. 12/506,076 filed Jul. 20, 2009, the disclosure of which is incorporated herein by reference.

BACKGROUND OF THE INVENTION

1. Field of the Invention

The present invention generally relates to gifts of digital media. More specifically, the present invention relates to managing gifts of digital media.

2. Description of the Related Art

Digital media encompasses a range of audio, video, video games, and other software applications. Digital media is typically sold or transferred via download over a communications network or on some form of digital storage media including optical discs such as a compact disc (CD) or digital versatile disc (DVD) as well as non volatile memory such as flash memory. Initial purchasers of digital media, either through a download or on a storage medium, buy the digital media new, unused, and directly from the publisher, manufacturer, or authorized retailer. Following acquisition and play of the digital media, an initial purchaser may lose interest in the digital media. Some initial purchasers may only desire to have the digital media for a short period of time, until they view a movie once or twice, or 'beat' a particular game. Subsequent to achieving that short term goal, the initial purchaser may wish to resell, swap, rent, lend, or otherwise give away the digital media to others for their use or enjoyment.

Various intermediaries may facilitate the transfer to a secondary user, including intermediate secondary users (e.g., another short-term user), resellers (e.g., eBay, GameStop), lenders (e.g., a public library), or lessors of the media (e.g., GameFly). Rather than having to buy a new copy of a video game or other digital content on a corresponding digital storage medium (e.g., a DVD), a secondary user is provided with a copy that has been previously owned and/or used. Because the digital media has been previously owned or has been used by any number of secondary users when borrowed or rented, the price of an item of digital media on the secondary market is generally lower than those prices paid by initial purchasers.

Such secondary markets can be an important part of the distribution and development lifecycle. For example, secondary markets may be useful to publishers and authors because secondary markets may allow for promotion a particular title or series through word-of-mouth publicity or viral marketing. These grass-root efforts allow for sampling of lesser-known titles and publishers and may contribute to building future dedication to or interest in the titles or publisher. Secondary markets also allow for physical media to be recycled for use by multiple users who might not otherwise make the investment in a particular game platform if there is a lack of available content at a moderate price.

Notwithstanding the importance of the secondary user market, secondary users—and parties that facilitate secondary purchases—can cause a significant financial loss to the publisher, manufacturer, and/or authorized retailer of initial copies of digital media. Secondary users are usually motivated by the lower purchase or rental prices offered by secondary markets. Secondary users may not desire to acquire a catalog of content or to re-watch or replay a particular movie or game over time. These considerations and corresponding effects become even more pronounced as the costs of producing content and digital media increase.

SUMMARY OF THE INVENTION

Embodiments of the present invention include managing gifts of digital media. A sender of such a gift designates the digital media to be given to a particular recipient. The digital media may have been previously purchased and/or registered by the individual. Alternatively, the digital media may be new and unused and purchased specifically as a gift for the recipient. The sender may use a client device to send a gift notification to a server that verifies that the sender is authorized to make the gift. Authorization may be based on matching an identifier of the digital media with an identifier associated with the sender. The transfer of the digital media may then be initiated and recorded in memory of the server. The transferred digital media may be associated with a set of rights and privileges. Further rights and privileges associated with the digital media may be offered to the recipient. A sender may also send the recipient a gift of credit that can be applied toward a purchase of the additional rights and privileges.

An exemplary method for managing gifts of digital media includes receiving a gift notification concerning a gift of digital media to a recipient designated by the sender of the gift notification, verifying that the sender is authorized to give the digital media, initiating the transfer of the digital media to the designated recipient, storing information regarding the transfer of the digital media to the designated recipient in the memory of the server, and sending a message from the server to the designated recipient concerning the transfer of the digital media. The message may include an offer concerning rights or privileges associated with the digital media.

An exemplary system for managing gifts of digital media may include a first client device associated with a sender of the digital media, a server for verifying that the sender is authorized to make a gift of the digital media, and a second client device associated with a recipient designated by the sender. The client device associated with the sender sends a gift notification to the server. To verify that the sender is authorized to send the digital media, the server matches an identifier of the designated digital media with an identifier associated with the sender and/or sender client device. The transfer may then be initiated and recorded in memory. A message concerning the gift is sent from the server to the second client device, which is associated with the designated recipient of the gift.

A further claimed embodiment includes a computer-readable storage media for managing gifts of digital media. Embodied on the storage medium is a program, the execution of which by a processor provides a method for managing gifts of digital media in general accordance with that method previously set forth above.

DETAILED DESCRIPTION

Embodiments of the present invention allow for managing transfers of digital media from a sender to a recipient. Digital media may include downloadable media, streaming media, digital media stored in a storage medium (e.g., CD or DVD), and various combinations of the foregoing. Such transfers may be referred to as "gifts" and may encompass transactions involving sales purchases, trades/exchanges, and renting in addition to non-reciprocated transfers. Regardless of the motivations of the sender, the sender may wish to make a gift (i.e., transfer) of certain digital media to a certain recipient. To effectuate the transfer, the sender is verified as being authorized to give the digital media. The gift may affect the rights or privileges associated with the digital medium in cases where such rights or privileges depend on whether the recipient receives new, unused digital media or previously used or played digital media.

Figure 1:
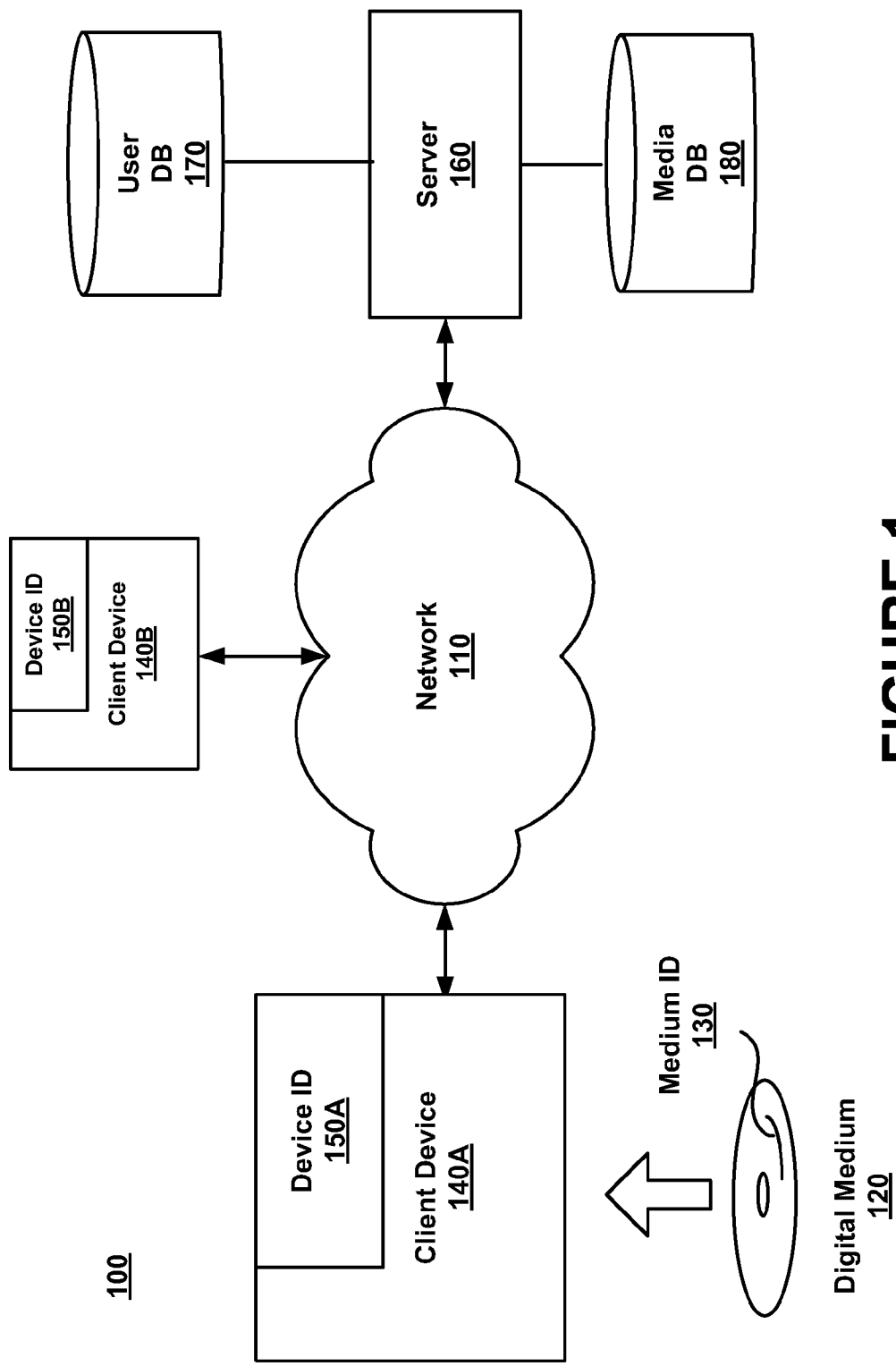
FIG. 1 illustrates an exemplary server-client environment where a digital device is in communication with a server via a communications network.

The management of such gifts of digital media may occur in a client-server environment. FIG. 1 illustrates an exemplary client-server environment 100 where client devices 140A and 140B are in communication with a server 160 via a communications network 110. A digital storage medium 120 having a unique medium identifier 130 may be played on the client device 140A. Each client device 140A and 140B has a unique device identifier: 150A and 150B, respectively. The client device 140A may communicate information regarding both the client device 140A and the digital storage medium 120 to server 160 over communication network 110.

The server 160 of FIG. 1 is in further communication with a user database 170 and a media database 180, which may be local or remote to the server 160. Server 160 can access stored data in both the user database 170 and the media database 180 and provide that data, or information derived from or related to the same, to client devices 140A and/or 140B. Conversely, the server 160 may receive information from client devices 140A or 140B and store the same in user database 170 or media database 180 as is appropriate.

Communication network 110 may be a local, proprietary network (e.g., intranet) and/or may be a part of a larger wide-area network. The network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 110 allows for communication between the various components of server-client environment 100.

The digital medium 120 of FIG. 1 may include a media storage device such as a CD or DVD. Digital media can include information and content that may be accessed on digital medium 120 and played on client devices 140A or 140B (e.g., a file of content rather than the storage medium for that content). Digital media may include portions of data or locked or 'secure' data whereby further information and/or interaction with server 160 may be required in order to unlock, access, or play that data. In some instances, the information or content may be downloaded over network 110. In such an instance, the content may be stored in memory at the client device 140A or in some other form of storage. The downloaded content may still embody a unique identifier or other information to delineate one download from another (e.g., watermarks, file headers, DRM wrappers).

Each digital medium 120 is associated with a medium identifier 130 to uniquely identify the digital medium 120. The medium identifier 130 may be physically stamped on a CD-ROM, DVD-ROM, or associated documentation (thereby requiring manual entry of the information by a user), and/or be part of the information stored in the digital medium 120 and readable by the client devices 140A or 140B. The medium identifier 130 may be assigned to the digital medium 120 by a manufacturer or publisher in the course of producing the digital medium 120. In the case of downloaded content, and as noted above, the identifier 130 may be a watermark, file header, DRM wrappers, or some other indicia embedded in or otherwise associated with the downloaded content file.

Client devices 140A and 140B of FIG. 1 are electronic devices, such as an electronic gaming system, a general-purpose computer, a set-top box, a Blu-Ray player, or a portable gaming device that may access the contents of the digital storage medium 120. Each client device 140 may also be configured to access data from other storage media, such as memory cards or disk drives as may be appropriate in the case of downloaded content. Client devices 140A and 140B include standard computing components such as network and media interfaces, computer-readable storage (memory), and processors for executing instructions that may be stored in memory.

Each client device 140 is associated with a unique device identifier 150. During a use of the client device 140, a user may register (either manually or through an automatic exchange of data over network 110) the client device 140 (and device identifier 150) with the server 160. The client device 140 may be registered and identified thereafter by reference to the device identifier 150, a corresponding user identifier, or both. The server 160 stores a device identifier 150, a corresponding user identifier (or identifiers), or both in the user database 170. A first-time user of client device 140 may be prompted by the server 160 to enter further user information, which may also be stored in user database 170. Either the device identifier 150 or a user identifier may be used to identify a particular user.

Information may be sent from the client device 140 over the network 110 to the server 160 for storage in one or more databases, including the user database 170 and/or the media database 180. The server 160 can later access data stored in either the user database 170 or the media database 180 for various purposes including providing rewards to classifications of purchasers of content. Databases 170 and 180 are discussed in more detail in conjunction with FIGS. 2A-B. Server 160, like client devices 140A and 140B, includes standard computing components such as network and media interfaces, computer-readable storage (memory), and processors for executing instructions that may be stored in memory.

Figure 2B:
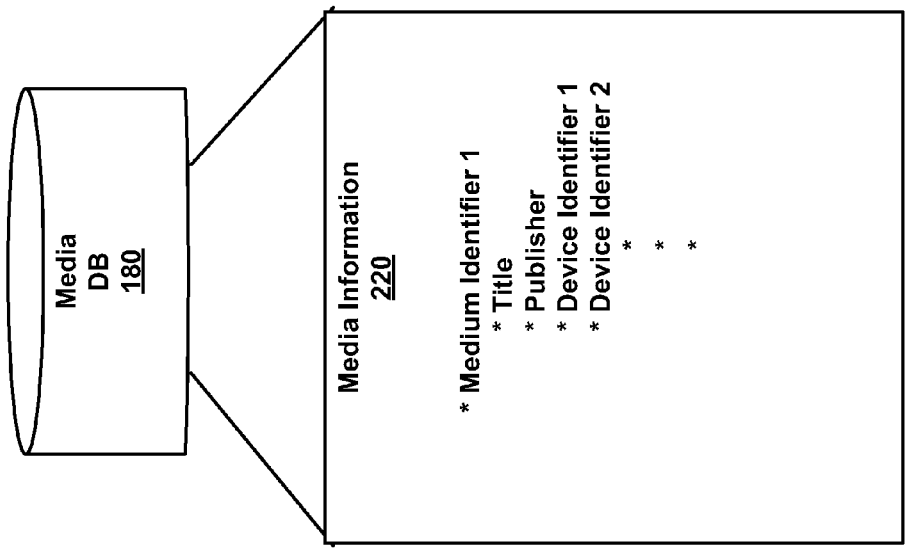
FIG. 2B illustrates a media database accessible to the server of FIG. 1.
Figure 2A:
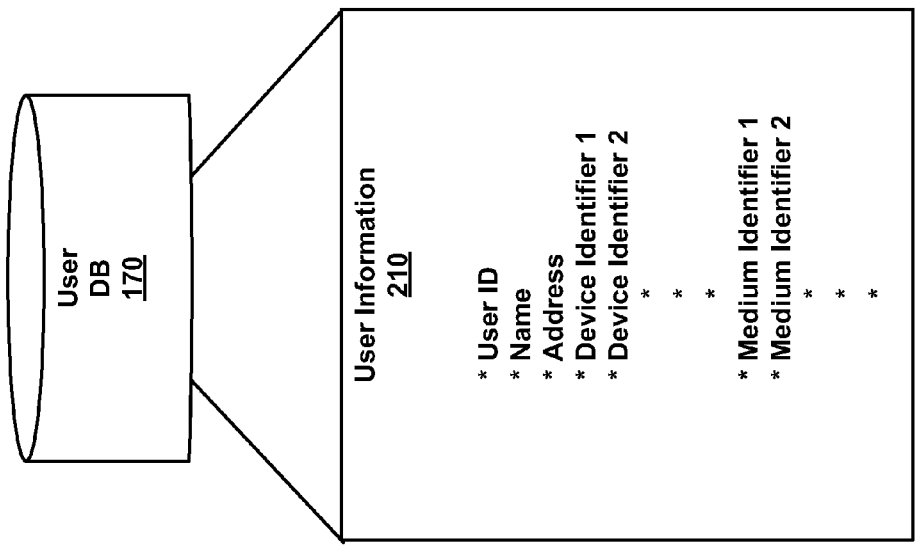
FIG. 2A illustrates a user database accessible to the server of FIG. 1.

FIG. 2A illustrates a user database 170 accessible to the server 160 of FIG. 1. The user database 170 includes user information 210 with respect to a multitude of users. Stored user information 210 may include name, user identifier, address, preferences, one or more device identifiers of digital client devices associated with the user, and one or more media identifiers of media associated with the user or a device. The user database 170 may receive information and/or updates concerning users based on a user registration, registration of a new digital device 140, registration of new digital media, including a digital medium 120, association with digital storage media, and corresponding medium identifier 130, registration for a service, and requests for updates.

FIG. 2B illustrates a media database 180 accessible to the server 160 of FIG. 1. The media database 180 includes media information 220 concerning a variety of digital media. Each digital medium 120 may be listed by medium identifier 130. Information concerning a particular digital medium 120 may include title, publisher, one or more digital client devices 140 that have played the digital medium 120, the number of times the medium 120 has been played, the number of times a particular medium 120 has been transferred or exchanged, or combinations of the same. The media database 180 may be populated with information from user registrations, from publishers, or a combination of the foregoing.

When a media identifier 130 is received by server 160, media database 180 and media information 220 are surveyed to determine whether the particular identifier 130 has previously been registered in the database 180. If the database 180 lacks media information 220 corresponding to that particular media identifier 130, then the system presumes that the corresponding digital storage medium 120 is newly purchased and is being registered for the first time The medium identifier 130 is also associated with the digital device 140 that played the digital medium 120 for the first time. A user associated with the digital device 140 is then characterized as a purchaser of the digital medium 120 and granted certain capabilities as further described below.

If the medium identifier 130 received from the digital device 140 has been previously registered in media database 180, then a determination may be made as to whether the digital device 140 that is playing the corresponding digital medium 120 is that digital device 140 that initially registered the newly purchased digital storage medium 120. If the digital device 140 that is currently playing the digital medium 120 matches the same digital device 140 that registered the digital medium 120, then it is presumed that the current user of the digital medium 120 is the previously registered purchaser of that storage medium 120.

If it is determined that a different digital device 140 is playing the storage medium 120, the server 160 may instantiate a query operation to the digital device 140. Through this query, the server 160 may notify the digital device 140 as a user currently operating the same the device identifier 150 as it corresponds to that particular digital device 140 does not match the device identifier 150 as it pertains to the medium identifier 130 previously stored in database 180. The operator of the disparate digital device 140 may be requested to provide user information as the user database 170 maintains information pertaining to devices, users, and certain media as described above.

In some instances, an initial purchaser of content may have simply taken the content to another location to engage in game play or to view a movie (e.g., to a friend's house, that friend having their own digital device 140). If the user of the digital device 140 is able to provide user identification that corresponds to the medium identifier 130 notwithstanding the disparity in device identifier 150, then certain rights and privileges may continue to be granted. If the requisite identification or information is not provided, then the user and/or device playing the medium 120 may be characterized as a secondary user or gift recipient as is further addressed below.

Among the rights and privileges associated with a particular digital medium 120 is the ability to transfer the digital medium 120 to another user. For example, an individual may wish to sell or otherwise give digital medium 120 to another user. A sender of a gift of digital medium 120 may therefore generate a gift notification indicating the particular digital medium being gifted (i.e., digital medium 120) and a particular recipient. Upon receiving the gift notification, server 160 may search user database 170 to determine the identity of the sender and whether the digital medium 120 is associated with the identified sender. If the sender is associated with the digital medium 120, the sender is authorized to transfer the digital medium 120 to the designated recipient.

In some instances, the sender may wish to purchase new, unused digital media (i.e., digital medium 120) specifically as a gift for the designated recipient. In some embodiments, server 160 may host or be otherwise associated with a sales application for selling new digital media. Upon purchase of new digital medium 120 by the sender, the information regarding the digital medium 120 may be saved to both user database 170 and media database 180. The sender may, however, designate the purchase for transfer to another user (i.e., the recipient of the gift of digital media 120). The recipient may be designated by name, address, user ID, email address, or various combinations thereof.

The designation of a recipient of a gift of digital media may be recorded in both the user database 170 and media database 180. A database entry about the recipient stored in user database 170 would therefore reflect the association with the digital media 120. Likewise, the database entry about the digital medium 120 includes information regarding the association with the recipient.

The stored information regarding the transfer may further indicate whether the recipient has received and/or registered the gift of digital medium 120. For example, where the digital medium 120 is downloadable, the information stored in user database 170 and/or media database 180 may indicate whether the recipient has downloaded the digital medium 120. Likewise, if the digital medium 120 is embodied in a storage medium (e.g., CD or DVD), the information stored in user database 170 and/or media database 180 may indicate whether the digital medium 120 has been played or registered on a client device (i.e., client device 140B) associated with the recipient.

Where the digital medium 120 being transferred is not newly purchased as a gift (e.g., where the sender has previously used or played the digital medium 120), the information regarding the transfer may further indicate that the recipient of the gift is a secondary user. If the digital storage media (e.g., CD or DVD) is simply given or handed over to a secondary user, the secondary user may be prompted to register the digital media 120 before play on client device 140B. As such, server 160 may encounter a disparity between device identifier 150B and medium identifier 130, because the original purchaser of the digital medium 120 is no longer the owner of the medium 120 and has sold or given the same to the secondary user. If the current user of the digital storage medium 120 is unable to provide the correct corresponding user identification or expressly indicates that they are a secondary owner of the digital storage medium 120 as noted above, then records at the user database 170 and media database 180 are updated to reflect, at the very least, that the current user of digital medium 120 corresponding to a particular medium identifier 130 should now be considered a secondary user.

The status of secondary user (versus an initial purchaser) may be associated with a different set of rights and privileges with respect to the digital medium 120. The secondary user may be able to acquire the same rights and privileges as an initial purchaser, but only after purchasing those rights or upgrading to a higher classification of owner. Toward this end, the sender of the gift of digital medium 120 may also include a gift of credit that can be applied toward the upgrade. The gift of credit may also be applied to other purchases of digital media in the context of an online sales application or other sales outlet associated with the credit. Information regarding the credit may also be stored in user database 170 in association with other recipient information.

In some instances, a purchaser or seller of the digital storage medium 120 might preemptively update user information 210 and media information 220. Information may be updated directly from a digital client device 140 or through a secondary interface such as a web-based browser on a computer. As discussed above, certain updates to user and media information (210/220) may also be made at the initial point of sale as a part of the sales transaction. A user may also update a record to indicate that while they remain the original owner that they have since acquired a new digital client device 140 that should be associated with the user identification or replace a preexisting device identifier 150.

Figure 3:
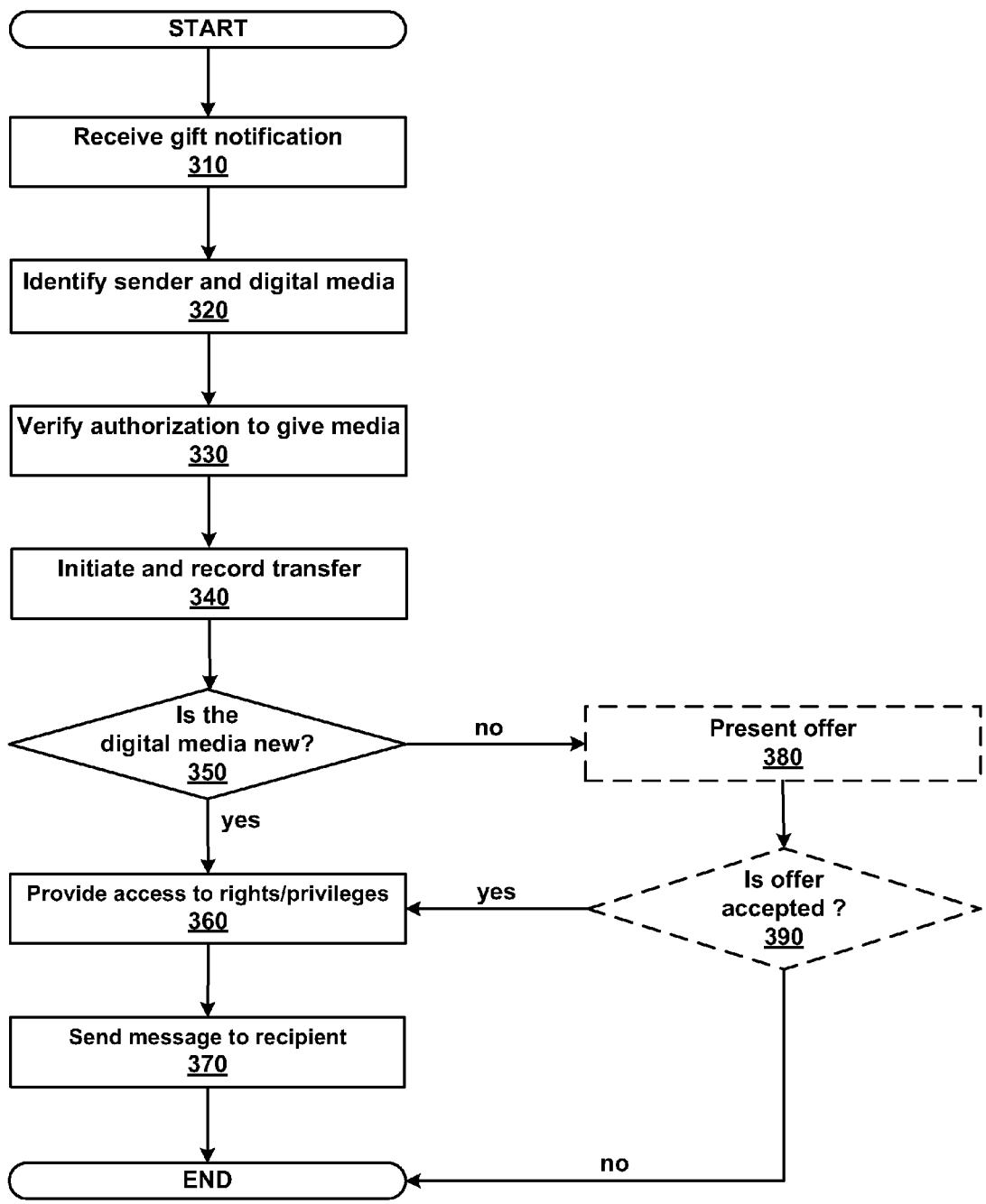
FIG. 3 is a flowchart illustrating an exemplary method for managing a gift of digital media.

FIG. 3 is a flowchart illustrating an exemplary method 300 for managing a gift of digital media. The method 300 of FIG. 3 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 as illustrated in FIG. 3, a sender may designate a digital medium (digital medium 120) via a digital client device (client device 140A), as a gift to a designated recipient. The designation triggers delivery of a gift notification to server or other computing device (server 160) over a communications network (network 110). The notification may include information concerning the sender, client device, and digital medium, each of which may be associated with unique identifiers. Based on information in the gift notification, the sender is identified. A determination is then made as to whether the sender is authorized to give the digital medium (e.g., the sender is a purchaser of new digital media or owner of previously-used digital media). If the sender is authorized to transfer the digital medium, the transfer is initiated and recorded in memory. If the digital media is new, a message is sent to the recipient concerning the gift of digital media and the rights and privileges associated with the digital media. If the digital media is not new (e.g., previously played by the sender or a previous owner) an offer may be presented to either the sender or the recipient concerning an upgrade with respect to rights or privileges associated with the digital medium.

Embodiments of the present invention may be implemented in the context of recommendations of digital media. A first party (who may or may not own the actual media being recommended, such as a particular digital download) may make a recommendation to another party. This recommendation may be based on personal experience through ownership or first-hand game play by the first party. Alternatively, the recommendation may be based solely on the first party having knowledge of the particular likes (or dislikes) of a second party. The recommendation may include a base component of the recommended digital media (i.e., an actual file) or a reference or link to the same (e.g., instructions for accessing the recommended media or a hyperlink to the recommended media). The base component accessed as a part of or in light of the recommendation may be upgraded in accordance with a contextually appropriate variation of the methodology set forth herein.

If the sender accepts the offer (e.g., purchases the upgrade), the message to the recipient may be updated accordingly. For example, the message may simply indicate that the gift of the digital medium is associated with certain specified rights or privileges, including the upgraded rights or privileges. Alternatively, the message may further indicate that in addition to the gift of the digital medium, the sender is also giving the recipient a gift of credit that can be applied toward a purchase of the upgraded rights or privileges. In some instances, it is the recipient that accepts the offer and initiates the purchase of the upgraded rights or privileges.

In step 310, a gift notification is received at a server or other computing device tasked with determining whether a sender authorized to give away particular digital media. The gift notification may concern a gift of a digital medium 120 with media identifier 130 and previously played or otherwise associated with a digital client device 140A with device identifier 150A. When the sender designates the particular digital media 120 for a particular recipient, a gift notification may be generated concerning the gift designation, including the details of the digital media 120.

A sender of the gift notification and the designated digital medium is identified in step 320 following receipt of the gift notification of step 310. Using the notification information received in step 310, the server 160 may formulate a search based on identifying the sender (i.e., user of digital device 140A). Specifically, the server 160 may search the user database 170 for the unique device identifier 150A of the digital client device 140A. The device identifier 150A may be found, for example, in user information 210 associated with the sender. The user information 210 may also indicate whether the sender has previously registered the digital medium 120. The server 160 may also formulate a search for the medium identifier 130 associated with the designated digital medium 120 and determine whether medium identifier 130 is associated with a device identifier 150A of a client device 140A associated with the sender.

Based on the user information 210 of the identified sender, it is then determined in step 330 whether the sender is authorized to transfer the digital medium 120 to another individual. In an exemplary embodiment, it is determined whether the sender is an initial purchaser of a new, unused copy of the digital medium 120 specifically as a gift for the designated recipient. Alternatively, it may be determined that the sender has previously registered the digital media for his/her own personal use or play. Such information may be used to determine whether the sender is authorized to make a gift of the digital media and whether the digital media is newly purchased as a gift or previously used by the sender or previous owners.

Once the sender is determined to be authorized to make a gift of the digital medium 120, the transfer is initiated, and information regarding the transfer may be stored in memory (i.e., user database 170 and/or media database 180) in step 340. Where the digital medium 120 is downloadable, the initiation of the transfer may involve providing the recipient with access to the downloadable digital medium (e.g., generating a link for download). In some instances, the initiating the transfer may involve creating a user account and allowing the recipient access to various online services or forums associated with the digital medium 120. Where the digital medium 120 is previously used/played by the sender, the sender may be denied further access to the digital medium 120 and any associated rights or privileges.

The degree of such access may depend on whether the digital medium 120 is new or previously used/played. In step 350, the digital medium 120 may be identified as being new, unused, and/or purchased specifically as a gift for the recipient. Such a determination may be made based on an evaluation of information related to the unique medium identifier 130 of the digital medium 120. For example, user information 210 may indicate that a user is an initial or secondary purchaser of digital medium 120 and further, whether the user has used or played the digital medium 120. Media information 220 may also be searched for indication that the digital medium 120 has been played on any of the digital client devices 140 associated with the sender.

If the digital medium is determined to be new, the recipient is allowed all the rights or privileges associated with ownership of new, unused digital medium 120 in step 360. Such rights or privileges are not generally accessible to users who purchase or are given previously used copies of digital medium 120. The rights or privileges may include improved audio-visual quality in the play of the digital medium on the digital device, wherein the level of audio-visual quality is superior to a level of audio-visual quality available to users belonging to a second or different classification. The rights or privileges may also include the ability to receive or be associated with a digital trophy related to game play or certain achievements therein. The digital trophy may, in some instances, be portable to other digital media whereby the user may receive a trophy in one game genre and be associated with that trophy in another genre.

The rights or privileges may alternatively or further include the ability to customize play of or interaction with the digital medium 120. For example, a user may be able to design or change aspects of different levels of game play. Changes may also be decorative and include skinning or allow for the introduction of particular visual interfaces or other overlays. Customization may also apply to introduction of sound effects and/or the ability to introduce certain sound effects in response to occurrence of certain events or at certain points of play of the digital medium. Customization may also include the ability to configure a control device associated with interacting with the content. For example, a user may not desire to play a game using a default controller configuration. Customization rights or privileges may allow a user to reconfigure how a particular button or other interaction input on a control device results in a change or reaction with respect to the digital medium (e.g., movement of a character).

Other rights or privileges might include additional or enhanced abilities for a character in a video game. For example, a game character might enjoy enhanced strength or stamina or receive certain powers not otherwise available to that character. Such enhancements or abilities might be specific to a character associated with the rewarded user or might apply to a family of characters associated with the user or other characters that belong to a team or clan associated with the rewarded user.

Other rights or privileges include additional modes of game play or tutorials related to game play whereby a user may receive instructions as to certain maneuvers or in-game interactions. A user might also be given an additional save point for a video game whereby the save point allows game play information to be saved at a designated moment in game play. As a result, the user is able to restart or 'backup' to the information at the save point rather than start over from the beginning of game play or an earlier save point that might not reflect certain efforts or accomplishments achieved since that prior save point.

Rights or privileges might also include access to related literature or media or other information about the game or media. Such information might include previews or exclusive news or other information concerning upgrades and future releases. Rights or privileges may also encompass discounts on related purchases either in the game or in the real world and associated with the game or media (e.g., a discount on a second movie in a series or the next release in a video game franchise). Rights or privileges might also include redeemable points that may be used to acquire various prizes or objects in the game or in the real world.

Based on the digital medium 120, the amount and type of rights or privileges available may vary. Further, new rights or privileges may become available over time. The rights or privileges may be provided through downloading content from server 160 to client device 140. In some cases, the content of the rights or privileges may already be stored on digital medium 120, but inaccessible until the determination was made in step 350 that the digital medium 120. In cases where the recipient is given a gift of previously used digital medium 120, the recipient may also be allowed access to the rights or privileges upon acceptance of an upgrade offer. Such an upgrade offer is discussed in further detail below with respect to steps 380 and 390.

In step 370, a message is sent to notify the recipient regarding the gift of digital medium 120 from the sender. Using information from the gift notification, the user database 160 may be searched for information identifying the recipient, including name, address, email address, user ID, etc. The message may be sent to the client device 140B associated with the recipient, or alternatively, to an email address associated with the recipient. In cases where the digital medium 120 downloadable or streamed, the message may include the link for download or streaming, as well as any required passwords. Alternatively, the message may include the digital medium 120 as an attachment or otherwise provide or facilitate access to the digital medium 120. The message may further include information regarding the various rights or privileges associated with the digital medium 120 and described above with respect to step 360.

In some embodiments, the digital medium 120 is determined to be previously used or played. As such, the recipient may only have access to a certain set of rights or privileges that are more limited than if the digital medium 120 were new. A message may therefore be sent to the recipient in step 380 that includes an offer to upgrade the rights or privileges associated with the digital medium 120. The offer may require a payment or registration for acceptance. The incentive for accepting such an offer is access to the rights or privileges associated with new, unused gifts of digital medium 120. Such an offer may encourage recipients to convert their status from one akin to secondary purchasers, so that they are afforded the benefits and rewards enjoyed by initial purchasers of digital media. Alternatively, the message may be sent to the sender of the gift, in case the sender wishes to provide the upgrade as an additional gift.

In step 390, it is determined whether the offer presented in the step 380 is accepted. Acceptance, as noted above, may include a payment or providing additional registration information. Upon an indication of acceptance, server 160 may then initiate the processing of payment or query for more information. Where the offer is accepted by the sender, the sender may purchase the upgrade as an additional gift for the designated recipient. In some cases, the gift of the upgrade may be provided in the form of "store credit" that may be applied by the recipient to a purchase of the upgrade. As such, the sender may only provide part of the credit required to purchase the upgrade.

To complete the purchase of the upgrade, the recipient must then provide the remaining amount due, based on credit already held by the recipient or through further payment. Once the purchase and/or registration is completed, the recipient and/or digital medium 120 may then be assigned to a certain user/media classification and, as such, the recipient may be provided with access to the rights or privileges described with respect to step 360.

While the foregoing system and methodology has been described with respect to incentivizing a sender to make a new purchase of media for gifting or incentivizing a recipient to upgrade, the present systems and methods may also be used to offer disincentives to the gifting or purchase of secondary media. The foregoing rights or privileges, instead of being true rewards or additional benefits granted to a user may, in fact, be a standard component, right, ability or other aspect of game play. Upon a determination that the media has been previously used/played, those rights or benefits might be taken away or be further limited. This may be accomplished by server 160 sending a signal or other information to digital client device 140B that causes the digital medium 120 to be processed in such a way that those rights and benefits are not enabled or are otherwise "blocked." Upon upgrading or providing other registration information, the "block" may be removed and the rights or privileges may be restored.

The present invention may be implemented in an application that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for sharing digital media, the method comprising:

storing information regarding a plurality of digital media in memory of a server, the stored information indicating that each digital medium is associated with an owner and that ownership of the digital medium is associated with a set of rights and privileges exercisable in relation to the digital medium;

receiving at the server a communication from a client device associated with a sender, the communication concerning granting a designated recipient limited access to a designated digital medium, the limited access including lesser rights and privileges than the set of rights and privileges associated with ownership;

executing instructions stored in memory of the server, wherein execution of the instructions by a processor at the server:

identifies that the sender owns the designated digital medium based on matching an identifier associated with the sender to stored information regarding an owner of the designated digital medium, charges the sender for the limited access by the designated recipient to the designated digital medium upon determination that the designated digital medium has been previously used by the sender, wherein the sender possess the set of exercisable rights and privileges in relation to the previously used designated digital medium, and provides the designated recipient with limited access to the previously used designated digital medium based on the status of the designated digital medium being previously used; and sending to the designated recipient by way of the server:

a message concerning the limited access to the previously used designated digital medium based on the status of the designated digital medium being previously used, the message including information concerning the lesser rights and privileges afforded to the designated recipient that are associated with the previously used digital medium, and an offer concerning upgrading the lesser rights and privileges afforded to the designated recipient associated with the previously used designated digital medium in exchange for payment by the designated recipient.

2. The method of claim 1, wherein providing the designated recipient with limited access to the previously used designated digital medium includes allowing the designated recipient to download only a portion of the previously used designated digital medium.

3. The method of claim 1, wherein providing the designated recipient with limited access to the previously used designated digital medium includes allowing the designated recipient to download the previously used designated digital medium, wherein the download further includes an indication that the designated recipient is allowed limited access to the previously used designated digital medium.

4. The method of claim 1, wherein the offer is accepted and further comprising updating stored information regarding the previously used designated digital medium, wherein the designated recipient is allowed to exercise the upgraded rights and privileges in relation to the previously used designated digital medium.

5. The method of claim 1, wherein a set of rights and privileges associated with ownership of a second designated digital medium does not include granting limited access to others, and wherein only an owner of the second designated digital medium is provided with access to the second designated digital medium.

6. A digital media sharing system, the system comprising:
memory that stores information regarding a plurality of digital media, the stored information indicating that each digital medium is associated with an owner and that ownership of the digital medium is associated with a set of rights and privileges exercisable in relation to the digital medium;
a network interface that receives a communication from a client device associated with a sender, the communication concerning granting a designated recipient limited access to a designated digital medium, the limited access including lesser rights and privileges than the set of rights and privileges associated with ownership; and
a processor that executes instructions stored in memory, wherein execution of the instructions by the processor:
identifies that the sender owns the designated digital medium based on matching an identifier associated with the sender to stored information regarding an owner of the designated digital medium,
charges the sender for the limited access by the designated recipient to the previously used designated digital medium upon determination that the designated digital medium has been previously used by the sender, wherein the sender possess the set of exercisable rights and privileges in relation to the previously used designated digital medium, and
provides the designated recipient with limited access to the previously used designated digital medium based on the status of the designated digital medium being previously used; and a server that sends to the designated recipient:
a message concerning the limited access to the previously used designated digital medium based on the status of the designated digital medium being previously used, the message including information concerning the lesser rights and privileges afforded to the designated recipient that are associated with the previously used designated digital medium, and
an offer concerning upgrading the lesser rights and privileges afforded to the designated recipient associated with the previously used designated digital medium in exchange for payment by the designated recipient.

7. The system of claim 6, wherein providing the designated recipient with limited access to the previously used designated digital medium includes allowing the designated recipient to download only a portion of the previously used designated digital medium.

8. The system of claim 6, wherein providing the designated recipient with limited access to the previously used designated digital medium includes allowing the designated recipient to download the previously used designated digital medium, wherein the download further includes an indication that the designated recipient is allowed limited access to the previously used designated digital medium.

9. The system of claim 6, wherein the offer is accepted and further comprising updating stored information regarding the previously used designated digital medium, wherein the designated recipient is allowed to exercise the upgraded rights and privileges in relation to the previously used designated digital medium.

10. The system of claim 6, wherein a set of rights and privileges associated with ownership of a second designated digital medium does not include granting limited access to others, and wherein only an owner of the second designated digital medium is provided with access to the second designated digital medium.

11. A non-transitory computer-readable storing medium, having embodied thereon a program executable by a processor to perform a method for sharing digital media, the method comprising:
storing information regarding a plurality of digital media, the stored information indicating that each digital medium is associated with an owner and that ownership of the digital medium is associated with a set of rights and privileges exercisable in relation to the digital medium;
receiving a communication from a client device associated with a sender, the communication concerning granting a designated recipient limited access to a designated digital medium, the limited access including lesser rights and privileges than the set of rights and privileges associated with ownership;
identifying that the sender owns the designated digital medium based on matching an identifier associated with the sender to stored information regarding an owner of the designated digital medium;
charging the sender for the limited access by the designated recipient to the previously used designated digital medium upon determination that the designated digital medium has been previously used by the sender, wherein the sender possess the set of exercisable rights and privileges in relation to the previously used designated digital medium, and
providing the designated recipient with limited access to the previously used designated digital medium based on the status of the designated digital medium being previously used; and
sending to the designated recipient by way of a server:
a message concerning the limited access to the previously used designated digital medium based on the status of the designated digital medium being previously used, the message including information concerning the lesser rights and privileges afforded to the designated recipient that are associated with the previously used designated digital medium, and
an offer concerning upgrading the lesser rights and privileges afforded to the designated recipient associated with the previously used designated digital medium in exchange for payment by the designated recipient.

12. The non-transitory computer-readable storing medium of claim 11, wherein providing the designated recipient with limited access to the previously used designated digital medium includes allowing the designated recipient to download only a portion of the previously used designated digital medium.

13. The non-transitory computer-readable storing medium of claim 11, wherein providing the designated recipient with limited access to the previously used designated digital medium includes allowing the designated recipient to download the previously used designated digital medium, wherein the download further includes an indication that the designated recipient is allowed limited access to the previously used designated digital medium.

* * * * *